Nov. 22, 1960  J. L. McDERMOTT  2,960,707
VEHICLE WASHING APPARATUS
Filed July 9, 1958  2 Sheets-Sheet 1

INVENTOR
James L. McDermott

BY

ATTORNEY

Nov. 22, 1960 — J. L. McDERMOTT — 2,960,707
VEHICLE WASHING APPARATUS
Filed July 9, 1958 — 2 Sheets-Sheet 2

INVENTOR
James L. McDermott

BY Cecil L. Wood
ATTORNEY

United States Patent Office 2,960,707
Patented Nov. 22, 1960

2,960,707

VEHICLE WASHING APPARATUS

James L. McDermott, 1010 Westmount St., Dallas, Tex.

Filed July 9, 1958, Ser. No. 747,385

2 Claims. (Cl. 15—21)

This invention relates to apparatus for washing vehicles, and more particularly to washing apparatus including mutually opposed sets of revolving brushes and water sprays, between which a vehicle is driven to scour and remove dirt and grime from the side walls thereof.

The invention is particularly applicable to the washing of trucks, trailers and the like having substantially straight side walls and characterized by a degree of uniformity.

The invention is an improvement of the apparatus shown in my Patent No. 2,705,810, issued April 12, 1955.

In my patent above referred to, I have described and claimed improved apparatus for washing tractor-trailer combinations, and other like vehicles, including a pneumatic operating system which is normally under pressure to maintain rotary washing brushes in retracted positions through the medium of diaphragms which are deactivated by a vehicle actuated valve, releasing the brushes to the collapsing action of the diaphragms and suitable linkage to move the brushes into operative position, or toward the sides of a vehicle to be washed, aided by the action of a spring interconnecting the brushes. Simultaneously, the vehicle actuated valve causes the transfer of air under pressure to an air pressure reservoir equipped with a bleeder valve and from which air is transferred to two diaphragms, one actuating a switch to energize a motor for driving the rotary brushes while the other actuates to open position a valve which controls the water supply to a series of spray heads associated with the rotary brushes. The bleeder valve is effective to maintain only enough pressure in the air reservoir for a single washing, and upon depletion of pressure the diaphragms actuated thereby collapse to de-energize the brush motor circuit and close the water valve.

The apparatus shown in my patent above mentioned further includes rotary brush standards which support the brushes in vertical position but are inclined so that the brushes tend to move toward inoperative positions yet are restrained by counter-action of their operating diaphragms and the interconnecting spring, the spring being effective to maintain the brushes against the walls of a vehicle with substantially uniform pressure whether or not the vehicle is centered between the brush standards.

An object of this invention is to provide, in apparatus of the type described, an improved arrangement of brushes capable of washing a vehicle more efficiently and at a higher rate of speed.

Another object of the invention is to provide, in apparatus of the type described, a washing unit including a pair of pivotally supported standards each supporting a plurality of revolving brushes, each of the brushes being rotatable about a horizontal axis and the bristles thereof being arranged substantially parallel to its axis, the brushes supported by the respective standards being spaced vertically and horizontally in staggered relation to each other and the outer ends of the bristles of the several brushes terminating in a common plane.

The invention will be readily understood by referring to the following description and the accompanying drawing, in which.

Figure 1:
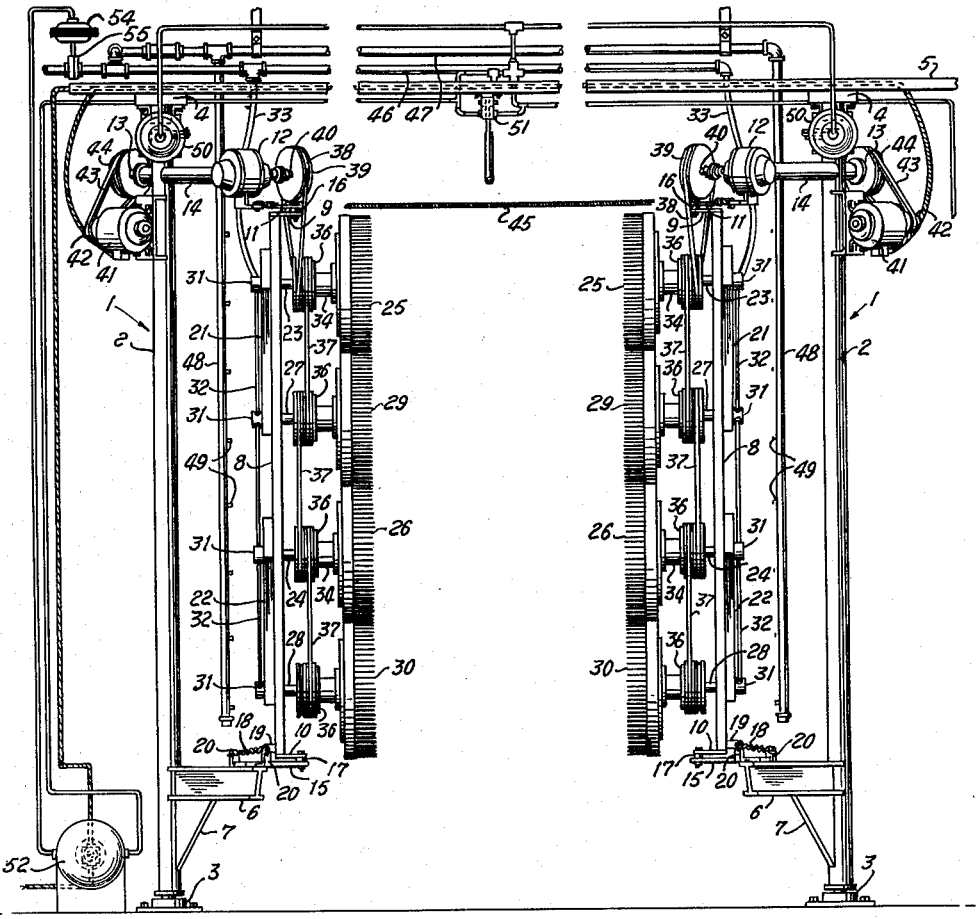
Figure 1 is a front elevational view of a washing unit embodying the invention, showing the unit in one of its operating positions.
Figure 2:
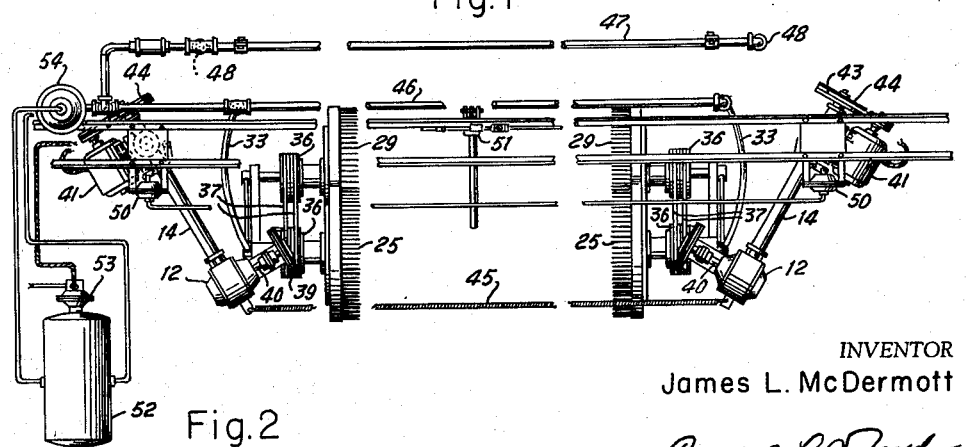
Figure 2 is a top plan view of the washing unit shown in Figure 1.
Figure 4:
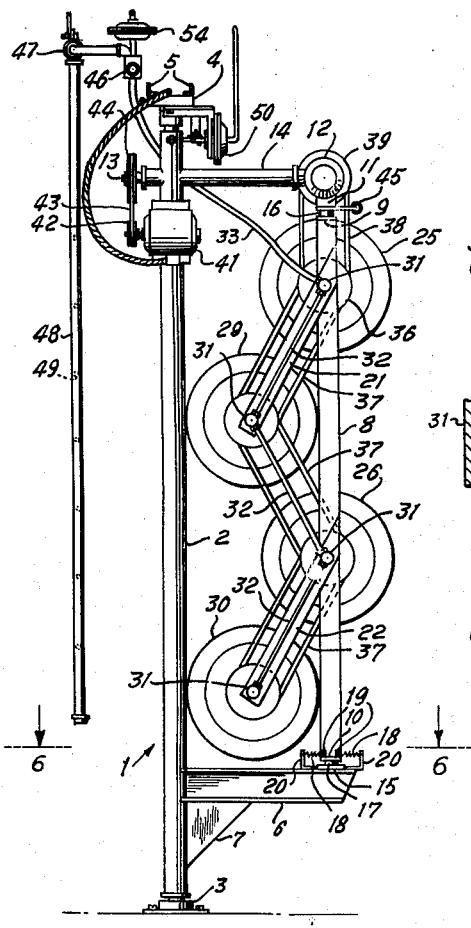
Figure 4 is an elevational view taken on the line 4—4 of Figure 3.
Figure 5:
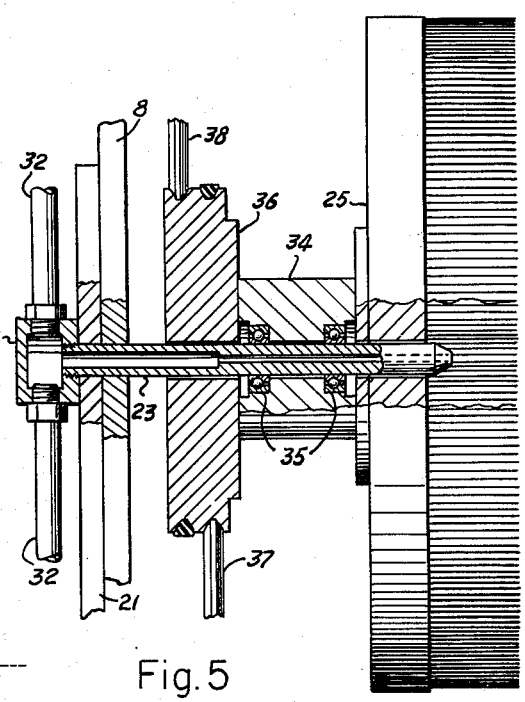
Figure 5 is a fragmentary elevational view on an enlarged scale, partly in section taken on a median line, of one of the revolving brushes, showing a water discharge nozzle arranged centrally thereof.

Referring to the drawing, the numeral 1 designates generally each of two brush assemblies, each of which comprises a standard 2, which is rotatable supported at its lower end in a floor flange 3 and at its upper end in a bearing 4 carried by a cross beam 5, which may be supported from the ceiling of a building, for example, in any suitable manner. The standard 2 has a lateral arm 6 affixed thereto at a point spaced above its lower end. The arm 6 is reenforced by a gusset plate 7.

A vertically disposed bar 8 has lateral extensions 9 and 10 adjacent its upper and lower ends, respectively. The uppermost extension 9 is pivotally connected at its outer end to a bracket 11, which is rigidly connected to the under side of a gear housing 12.

The gear housing 12 contains gears driven by a shaft 13 extending through a torque tube 14. The torque tube 14 is rigidly connected at one end to the gear housing 12, and is rigidly connected at its opposite end to the standard 2 adjacent its upper end. The torque tube 14 is arranged parallel to the arm 6. The bracket 11 extends horizontally outwardly from the gear housing 12 at right angles to the torque tube 14.

The lowermost extension 10 is pivotally connected at its outer end to a bracket 15, which is rigidly connected to the end of the arm 6 opposite the standard 2. The bracket 15 extends horizontally outwardly from the arm 6, at right angles to the arm 6 and parallel to the bracket 11.

Bearings 16 and 17 are positioned between the lateral extensions 9 and 10 of the vertically disposed bar 8 and the brackets 11 and 15, respectively. The vertically disposed bar 8, which is normally aligned with the brackets 11 and 15, is capable of being swung in a limited arc by movement of the lateral extensions 9 and 10 about their pivots.

The pivotal movement of the lateral extensions 9 and 10 is limited by a pair of tension springs 18. The springs 18 are each connected at one end to one of a pair of ears 19, which are connected to the lower end of the vertically disposed bar 8 and extend outwardly from the side thereof opposite the lowermost extension 10. The opposite ends of the springs 18 are each connected to one of a pair of ears 20, which extend outwardly from opposite sides of the bracket 15 at its juncture with the arm 6.

A pair of elongated brush supports 21 and 22 are each rigidly connected at one end to the vertically disposed bar 8, and are inclined downwardly and outwardly relative thereto. The brush supports 21 and 22 are spaced longitudinally relative to the vertically disposed bar 8, and are arranged parallel to each other. The brush supports 21 and 22 lie in a vertical plane which is perpendicular to the plane of the lateral extensions 9 and 10.

A pair of water discharge nozzles 23 and 24, which support a pair of revolving brushes 25 and 26, respectively, as hereinafter described, are inserted through openings provided therefor in the vertically disposed bar 8 at its juncture with the adjacent ends of the respective brush supports 21 and 22. Another pair of water discharge nozzles 27 and 28, which support a pair of revolving brushes 29 and 30, respectively, are inserted through openings provided therefor in the ends of the respective brush supports 21 and 22 opposite the vertically disposed bar 8.

The water discharge nozzles 23, 24, 27 and 28 are arranged parallel to the lateral extensions 9 and 10 of the vertically disposed bar 8. The nozzles 23, 24, 27 and 28 are each connected at one end to one of a plurality of couplings 31. The couplings 31 are connected in series by a plurality of pipe sections 32. The uppermost coupling 31 is connected to one end of a flexible conduit 33 whereby water is supplied to the nozzles 23, 24, 27 and 28, as hereinafter described.

The brushes 25, 26, 29 and 30 are journaled on the water discharge nozzles 23, 24, 27 and 28, respectively, whereby the brushes are each rotatable about a horizontal axis which corresponds to the longitudinal axis of the adjacent nozzle. The brushes each have an axial extension comprising a tubular member 34, which surrounds the adjacent nozzle and is enlarged internally for engagement by bearings 35 whereby the brush is journaled on the nozzle.

The bristles of the respective brushes 25, 26, 29 and 30 are arranged parallel to the axis of the brush, and the bristles of the several brushes terminate in a vertical plane which is perpendicular to the lateral extensions 9 and 10 of the vertically disposed bar 8.

A plurality of double grooved pulley wheels 36 each surround one of the water discharge nozzles 23, 24, 27 and 28, and are rigidly connected, respectively, to the adjacent tubular members 34. The pulley wheels 36 are connected one to another by a plurality of belts 37, whereby the brushes 25, 26, 29 and 30 are rotatable in unison. The uppermost pulley wheel 36 is connected by a belt 38 to a pulley wheel 39, which is connected to one end of a shaft 40. The shaft 40 extends outwardly from the gear housing 12, above the bracket 11, and is operatively connected to the shaft 13, by the gears in the gear housing 12, whereby the shaft 40 is driven by the shaft 13.

Figure 3:
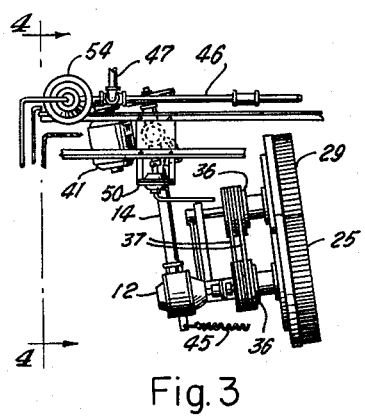
Figure 3 is a fragmentary top plan view showing the washing unit in another of its operating positions.
Figure 6:
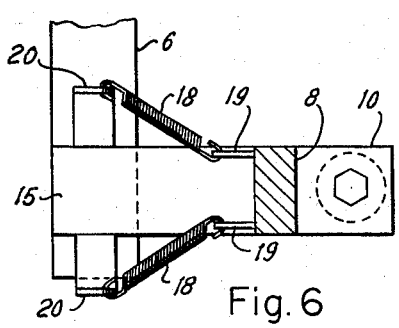
Figure 6 is a fragmentary sectional plan view, on an enlarged scale, taken on the line 6—6 of Fig. 4.

As shown in Figure 3, the brushes 25, 26, 29 and 30 are capable of being rotated in unison as above described, by the action of the pulley wheel 39 on the pulley wheels 36, independently of the position of the uppermost pulley wheel 36 relative to the vertical plane of the pulley wheel 39. In normal operation, the working faces of the several brushes lie in a common plane. The brushes are capable of limited pivotal adjustment, however, as above described, whereby their working faces will at all times be positioned substantially parallel to the adjacent side of the vehicle being operated upon.

On each standard 2 adjacent its upper end is mounted an electric motor 41 having a pulley 42 mounted on its shaft. A belt 43 engages the pulley 42 and pulley 44 mounted on the outer end of the shaft 13. By this arrangement the motors 41 drive the brushes of the respective brush assemblies 1, as above described.

A tension spring 45 is connected at its ends to the gear housings 12. The spring 45 normally urges the brush assemblies 1 toward each other, whereby the brushes yieldably engage the adjacent side of a vehicle being operated upon. The tension of the spring 45 may be adjusted by suitable means (not shown).

The arrangement above described permits limited adjustment of the spacing of the brush assemblies 1 relative to each others, to thereby compensate for variations in the widths of vehicles driven between the brush assemblies to be washed, while at the same time permitting limited pivotal adjustment of the respective brush assemblies so that the working faces of the several brushes are at all times positioned parallel to the adjacent side of a vehicle being operated upon.

Water is supplied to the brush assemblies 1 through a common water supply pipe 46, which is in fluid communication with the flexible conduits 33 of the respective brush assemblies 1.

A branch pipe 47, which is connected to the water supply pipe 46, supplies water to a pair of vertically disposed spray pipes 48, which have spray nozzles 49 spaced longitudinally relative thereto. Each of the spray pipes 48 corresponds to one of the brush assemblies 1, and is arranged to spray water on a vehicle being washed while at the same time water is being applied thereto through the nozzles 23, 24, 27 and 28, and the vehicle is being scrubbed by the brushes 25, 26, 29 and 30.

The brushes 25, 26, 29 and 30 are maintained in retracted position by means of a pair of diaphragms 50, which are normally maintained under air pressure, and which are capable of being de-activated by a vehicle actuated valve 51, whereby the brushes are acted on by the spring 45 to move them in operative position against the sides of a vehicle to be washed.

The vehicle actuated valve 51 causes the transfer of air under pressure to an air pressure reservoir 52, which is equipped with a bleeder valve. From the reservoir 52 air is transferred to two diaphragms, numbered 53 and 54. The diaphragm 53 actuates a switch to energize the motor 41 for driving the brushes 25, 26, 29, 30. The diaphragm 54 actuates to open position a valve 55 which controls the water supply to the nozzles 23, 24, 27 and 28. The bleeder valve is effective to maintain only enough pressure in the air reservoir 52 for a single washing. Upon depletion of pressure the diaphragms 53 and 54 collapse to de-energize the brush motors 41 and close the water valve 55.

In the operation of the apparatus above described, the brushes 25, 26, 29, and 30 are maintained initially in their retracted positions, as shown in Fig. 3 of the drawing, by the action of the diaphragms 50, which are maintained under air pressure, whereby a vehicle to be washed (not shown) may be driven between the brushes 25, 26, 29, and 30 of the mutually opposed brush assemblies, each of which is indicated generally by the numeral 1.

The vehicle, upon passing between the brush assemblies 1, acts on the valve 51, which controls the supply of air to the diaphragms 50, to move the valve 51 to and from a position in which the supply of air to the diaphragms 50 is interrupted, whereby the diaphragms 50 are deactivated, so that the brushes 25, 26, 29, and 30 of the respective brush assemblies 1 are acted on by the spring 45 to move them in operative positions in frictional engagement with opposite sides of the vehicle.

The vehicle actuated valve 51 also controls the supply of air to the pressure reservoir 52, which is equipped with a bleeder valve, and from which air is supplied to the diaphragms 53 and 54 for a predetermined period of time, sufficient to wash a single vehicle, which is a function of the bleeder valve.

The diaphragms 53 and 54 actuate, respectively, a switch which controls the supply of electricity to the motors 41, which drive the brushes 25, 26, 29, 30, and valve 55, which controls the supply of water to the nozzles 23, 24, 27, and 28.

The invention may be modified in various ways without departing from the spirit and scope thereof.

What is claimed is:

1. A vehicle washing apparatus comprising a pair of oscillatable brush supporting standards between which a vehicle is driven while being washed, each standard having a lateral arm carried by the lower end of the standard, a torque tube supported on the top of the standard in parallelism with the arm, a driving shaft in each torque tube, a gear assembly enclosed in a housing operated by each shaft supported by each tube, a brush supporting frame pivotally connected to each arm and each housing whereby it is capable of being swung in an arc about its pivots, spring means resisting the pivotal movement of each frame, a plurality of revolving brushes carried by each frame, the brushes each being rotatable about a horizontal axis, the bristles of the respective brushes being arranged parallel to its axis and the outer ends of the bristles of the several brushes terminating in a common plane, the brushes being positioned in staggered relation to each other, driving means operatively connecting the brushes to their respective gear assembly, a motor operatively connected to each driving shaft, and elongated spring means connected at its ends to the housings of the gear assemblies carried by the respective brush supporting standards whereby the working faces of the brushes carried by the respective standards are normally opposed to each other.

2. A vehicle washing apparatus as described in claim 1 having a plurality of water discharge nozzles carried by each of the brush supporting frames, each of the nozzles being aligned axially with one of the brushes and each of the brushes being journaled on the corresponding nozzle, and means for supplying water to the several nozzles.

References Cited in the file of this patent

UNITED STATES PATENTS

| | | |
|---|---|---|
| 1,411,321 | Wright | Apr. 4, 1922 |
| 1,448,062 | Krupeany | Mar. 13, 1923 |
| 2,651,795 | Kilgore | Sept. 15, 1953 |
| 2,705,810 | McDermott | Apr. 12, 1955 |
| 2,800,671 | Nowak | July 30, 1957 |